(12) United States Patent
Bodner et al.

(10) Patent No.: US 10,652,077 B2
(45) Date of Patent: May 12, 2020

(54) TECHNIQUES FOR INTERFACING BETWEEN WEB SERVICES AND INTERFACE DESCRIPTION LANGUAGE (IDL)-BASED REMOTE PROCEDURE CALL (RPC) SERVICES AND AN OPTICAL COMMUNICATION SYSTEM IMPLEMENTING SAME

(71) Applicant: SubCom, LLC, Eatontown, NJ (US)

(72) Inventors: Eric Bodner, Tinton Falls, NJ (US);
Wilko Eschebach, Tinton Falls, NJ (US); Yunlu Xu, Howell, NJ (US);
Richard Kram, Ocean, NJ (US);
Jonathan M. Liss, Marlboro, NJ (US)

(73) Assignee: SubCom, LLC, Eatontown, NJ (US)

( * ) Notice: Subject to any disclaimer, the term of this patent is extended or adjusted under 35 U.S.C. 154(b) by 25 days.

(21) Appl. No.: 16/120,185

(22) Filed: Aug. 31, 2018

(65) Prior Publication Data

US 2020/0076672 A1 Mar. 5, 2020

(51) Int. Cl.
*G06F 15/173* (2006.01)
*H04L 12/24* (2006.01)
*H04L 29/06* (2006.01)

(52) U.S. Cl.
CPC ...... *H04L 41/0273* (2013.01); *H04L 41/0233* (2013.01); *H04L 41/20* (2013.01); *H04L 67/42* (2013.01)

(58) Field of Classification Search
CPC . G06F 9/547; G06F 9/465; G06F 5/00; G06F 2209/545; G06F 9/542; G06F 9/548; G06F 16/972; G06F 8/41; G06F 16/9574; H04L 67/02
See application file for complete search history.

(56) References Cited

U.S. PATENT DOCUMENTS

| | | | | |
|---|---|---|---|---|
| 6,219,835 B1 * | 4/2001 | House | ...................... | G06F 9/547 717/114 |
| 6,728,788 B1 * | 4/2004 | Ainsworth | .............. | G06F 9/547 719/330 |

(Continued)

OTHER PUBLICATIONS

European Search Report dated Jan. 2, 2020 for European Application No. 19193833.1.

*Primary Examiner* — Michael A Keller
*Assistant Examiner* — Thao D Duong

(57) ABSTRACT

An embodiment of the present disclosure includes an RPC architecture that includes a central manager gateway with a client-facing side that allows for client access via web services protocols such as SOAP and REST. The central manager gateway further includes a server-facing side that can communicate with a plurality of network elements, with each network element implementing a common IDL architecture and RPC manager instance. Each of the network elements, and in particular their RPC manager instance, may communicate with other RPC manager instances to 'learn' the network topology for the system and maintain a topology database for purposes of exposing a naming service, e.g., a CORBA naming service. The network elements may elect one master element while the others remain as slaves. The central manager gateway may automatically locate the master network element and forward client requests to the same for servicing.

21 Claims, 11 Drawing Sheets

(56) References Cited

U.S. PATENT DOCUMENTS

| | | | |
|---|---|---|---|
| 2003/0105858 A1* | 6/2003 | Hogg | H04L 67/36 |
| | | | 709/224 |
| 2007/0014278 A1* | 1/2007 | Ebbesen | H04L 45/00 |
| | | | 370/351 |
| 2009/0199220 A1 | 8/2009 | Bahlke | |
| 2010/0312863 A1* | 12/2010 | Mohr | H04L 41/0813 |
| | | | 709/220 |

* cited by examiner

TECHNIQUES FOR INTERFACING BETWEEN WEB SERVICES AND INTERFACE DESCRIPTION LANGUAGE (IDL)-BASED REMOTE PROCEDURE CALL (RPC) SERVICES AND AN OPTICAL COMMUNICATION SYSTEM IMPLEMENTING SAME

TECHNICAL FIELD

The present application generally relates to communication systems that utilize remote procedure call (RPC) interfaces, and more particularly, to a system and methods for interfacing between web services and IDL-based RPC services and an optical communication system using the same.

BACKGROUND

With the development of the Internet and its related technologies, web applications and services are becoming more and more popular as well as important in the software industry. Among web technologies, Representative State Transfer (REST) has become one of the most ubiquitous and fast-growing technologies. There is an increasing demand for software to provide RESTful APIs to accommodate customized client-end user interface development and integration. Most development languages now include frameworks to build RESTful web services.

However, many existing implementations utilize the Common Object Request Broker Architecture (CORBA) which was developed during the Internet's infancy. CORBA is a software standard defined by the Object Management Group which many systems employ for cross-platform communication to maximize the advantages of different programming languages and manage distributed Network Element Services (NES). Consider C++ development for example, the native C++ development environment does not have native support for graphical user interfaces (GUIs), so C++ requires other development languages for the support of GUI development (e.g. JAVA). Likewise, CORBA uses interface definition language (IDL) to regulate the interfaces and objects presented to different implementations (e.g. C, C++, Java, Pascal, Python, Ruby) so that developers need not "re-invent the wheel" and develop cross-platform communication software, and by extension, save cost and time associated with development of such software systems. CORBA provides a well defined way of cross-platform communication where access is at the object level with much of the underlying client-server communication code hidden from the developer. Likewise, CORBA features a naming service that provides developers a simple way to register and look up the object references using logical names.

However, CORBA remains an impractical solution going forward due to non-trivial challenges. For instance, both client and server in the CORBA architecture require the same IDL to be utilized at runtime to ensure compatibility. A mismatch between IDLs can result in complete breakdown of communication between client and server. This makes CORBA implementations relatively brittle as even minor changes and upgrades to the exposed functions/methods require synchronization between server and all clients that may be impractical. Moreover, many existing solutions utilize some amount of propriety CORBA elements that require not only knowledge of CORBA itself but the nature of the changes to the core services. This proprietary knowledge can require extensive training and can unfortunately result in full, ground-up redevelopment of legacy CORBA software services rather than reuse of otherwise functional software.

BRIEF DESCRIPTION OF THE DRAWINGS

Reference should be made to the following detailed description which should be read in conjunction with the following figures, wherein like numerals represent like parts.

DETAILED DESCRIPTION

As discussed above, CORBA-based implementations remain in use in many deployed software applications, but the technology remains a challenge to develop and maintain in comparison to web-based technologies now widely in use. However, the problem of creating new software system that retains functional components and legacy support of an existing CORBA-based system remains a challenge as there remains numerous technical challenges in attempting to mix CORBA and modern web-based implementations.

Figure 1:
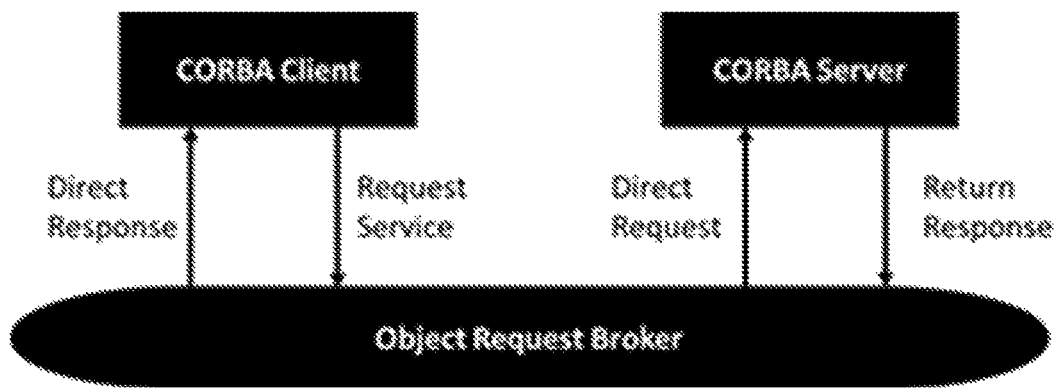
FIG. 1 is a simplified block diagram of communication architecture for a CORBA client and server.

The existing CORBA development process includes defining an IDL in plaintext. The IDL language includes syntax and formatting similar to other compiled/interpreted languages and defines methods, arguments and various parameters. The plaintext IDL is then compiled to generate adapters in a desired language, e.g., C++ or Java. The generated adapters may also be referred to as precompiled IDL adapters that can be instantiated during runtime (execution) of a given program. As shown in FIG. 1, CORBA client and server applications then form a 1:1 relationship between client and server based on their associated adapter. Requests are directly made between client and server and responses returned based on those requests through the use of an object request broker.

Unfortunately, CORBA was developed at a time when the Internet was in its infancy and security was not of primary concern. CORBA does not natively implement a security scheme and CORBA interfaces pose substantial security risks. Crude exposure of a CORBA interface is a potential threat to an entire software system as CORBA has no security checks at the interface level which leaves the server exposed on the Internet and an easy target for attackers.

Upgrades and minor changes to the underlying IDL also pose significant challenges to using CORBA as well. For example, both client and server must have a matching a IDL so any changes necessitate recompiling both client and server code with the updated IDL for synchronization purposes. This level of synchronization can be impractical, as separate teams dealing with client and server code often have large numbers of developers that can implement changes at a rate that makes complete client/server IDL compatibility virtually impossible. Moreover, even the reuse of existing CORBA implementations by software engineers is often avoided as the security risks, archaic knowledge, and rigidity of CORBA can outweigh the negatives of redeveloping code using modern technologies such as Simple Object Access Protocol (SOAP) and REST. Some approaches to exposing CORBA interfaces via modern web services, e.g., REST, SOAP, have been proposed to allow for reuse of CORBA. However, these approaches still require a significant amount of development time and experience as one must develop the communication process between the middleware and the CORBA interface.

Thus, in accordance with an embodiment, techniques are disclosed for interfacing IDL-based RPC architectures, e.g., CORBA, with web service approaches such as SOAP and REST. In particular, an embodiment of the present disclosure includes an RPC architecture that includes a central manager gateway with a client-facing side that allows for client access via web services protocols such as SOAP and REST. The central manager gateway further includes a server-facing side that can communicate with a plurality of network elements, with each network element implementing a common IDL architecture and RPC manager instance. Each of the network elements, and in particular their RPC manager instance, may communicate with other RPC manager instances to 'learn' the network topology for the system and maintain a topology database for purposes of exposing a naming service, e.g., a CORBA naming service. The network elements may elect one master element while the others remain as slaves. The central manager gateway may automatically locate the master network element and forward client requests to the same. In turn, the master network element may convert the web-services request and execute one or more IDL methods to satisfy the request. The master network element may then convert the response to the executed IDL methods into web-services message(s) and send the same back to the originating client, e.g., by way of the central manager gateway operating as a proxy or directly back to the client depending on a desired configuration. REST implements a stateless architecture, the webservices therefore do not support persistency of data messages across REST API calls. The central manager gateway can manage and facilitate such persistency thus maintaining the integrity of the CORBA infrastructure/services while also supporting REST web-service messages.

In one specific, non-limiting example embodiment of the present disclosure an IDL framework is disclosed that allows for generation of a plurality of Java adapters. A first adapter of the Java adapters contains IDL definitions defined for the CORBA based C++ system, to enable compiling and general CORBA communication, and a second adapter of the Java adapters includes definitions to offer runtime services. The runtime services may be provided by, for instance, stub definitions that may be overridden or otherwise extended by application programmers to implement logic specific to a given application. A RESTful service may then implement the plurality of adapters to provide REST services that comport with IDL requirements, e.g., CORBA, and also provide end-users with a method to customize and integrate application-specific logic. A graphical user interface (GUI) library based on an IDL may also be generated for purposes of providing client-side services. The GUI, various adapters, and other related components may be reused and compiled with the client and the server software to maximize code reuse (although the server does not necessarily present a GUI). In the context of the REST server, the plurality of adapters may be packaged libraries and the methods defined and implemented therein can be directly called and packaged with the other features that the integrated development environment supports.

Accordingly, the present disclosure provides numerous advantages over existing systems that crudely expose IDL-based services, or other approaches that discourage code reuse by redesigning and developing preexisting applications that expose IDL-based services such as CORBA. For example, applications developed with the RPC architecture disclosed herein may utilize existing CORBA services while also providing rapid development and extensible frameworks with a high level of customization and code reuse. In addition, modern services such as SOAP and REST can be client-facing to provide for secure and easily developed client access. Thus, the RPC architecture disclosed herein improves computer server systems by maintaining legacy code applications (with full compatibility with existing CORBA services, for example), removing the requirement of legacy knowledge to design new client applications, enhanced security, and the ability to transparently bridge legacy RPC technologies such as CORBA with web service architectures such as SOAP and REST. Moreover, an RPC architecture consistent with the present disclosure allows for a 1:N relationship between client and IDL-based services, e.g., CORBA, which transcends the limitations that normally impose a 1:1 relationship between client and server as discussed above with regard to FIG. 1.

Figure 2:
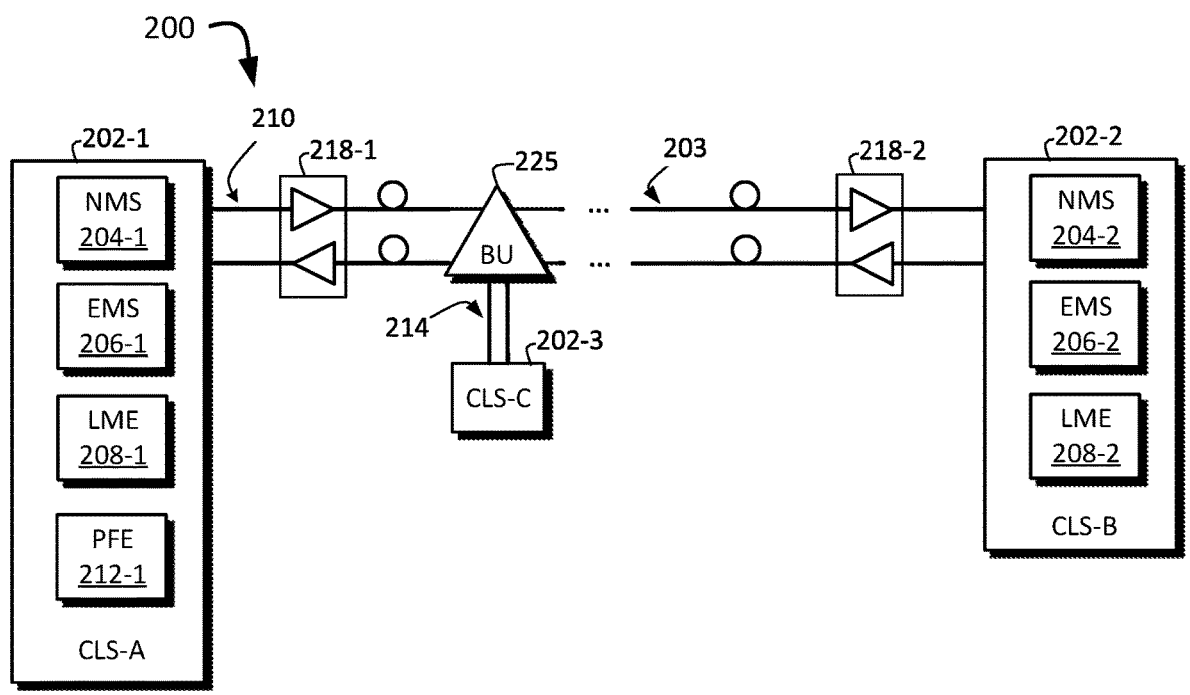
FIG. 2 is a simplified block diagram of one exemplary embodiment of an optical communication system consistent with the present disclosure.

Turning to the Figures, FIG. 2 shows an optical communication system 200 consistent with the present disclosure. The optical communication system 200 is shown in a highly simplified form for ease of description and not by limitation. The optical communication system 200 may be implemented as a subsea optical communication system wherein at least a portion of the elements are located below sea level. Further, the optical communication system 200 may be implemented as a wavelength division multiplexing (WDM) system capable of transmitting via a plurality of channel wavelengths. As shown, the optical communication system 200 includes an optical transmission path 203 that extends between a plurality of cable landing stations, namely cable landing stations 202-1, 202-2 and 202-3.

As shown, the optical communication 200 includes an optical fiber cable collectively shown as 210 that spans a relatively large geographic distance (e.g., tens, hundreds, or thousands of kilometers). The undersea optical network may thus comprise a plurality of "wet" optical components that are disposed along the sea floor or disposed on a sea-based platform, for example. However, cable segments are not necessarily limited in this regard and the optical communication system 200 may include, at least in part, some lengths of land-based optical fiber segments. Although examples and scenarios disclosed herein refer to cable landing stations or CLSs, the disclosure is not necessarily limited in this regard. For example, the techniques disclosed herein are equally applicable to any station located within the optical communication system including, for example, Network Operation Centers (NOCs) and Remote Operation Positions (ROPs), just to name a few.

Continuing on, the optical transmission path 203 includes at least one optical cable 210 comprising one or more optical fiber pairs. The optical transmission path 203 includes a plurality of optical components including repeaters 218-1, 218-2, and one or more branching units, e.g., BU 225. The BUs can include reprogrammable optical add/drop multiplexers (ROADMs) or other suitable optical filters/components (e.g., that can include circuitry for remote monitoring and control) for sending and receiving channel wavelengths from a branch path, e.g., branch path 214. Each cable landing station may include an Element Management System (EMS) for providing access to various optical components and for providing an interface to Command/Response Elements (CREs) within the system. Each of the optical components shown in FIG. 2 may also be referred to as network elements, with each network element allowing for remote access for configuration, monitoring and maintenance purposes. To this end, the term network element refers to any component, e.g., BU, ROADM, optical repeater, NMS, EMS, LME, PFE, in the optical communication system 200 that includes circuitry and/or software that enables remote, network-based communication through wired or wireless connectivity.

Each of the cable landing stations 202-1 to 202-3 may be disposed along a shore or on a platform. Each of the cable landing stations 202-1 to 202-3 may include line terminating equipment (LTE) such as channel line cards (not shown), power feed equipment (PFE) 212-1, and so on. The PFE 212-1 may be configured to provide a constant voltage or constant current along the optical transmission path 203.

As further shown, the first cable landing station 202-1 includes an NMS 204-1, EMS 206-1 and LME 208-1. The NMS 204-1 may be implemented as the NMS 304 discussed in further detail with reference to FIG. 3. Each NMS may be configured to communicate with N number of EMS systems. Each of the EMS systems may be configured to communicate with optical components such as repeaters and other elements local or otherwise adjacent to a given cable landing station. LME equipment may be utilized to perform high loss loopback (HLLB) or other measurements to ensure nominal performance and to detect faults, e.g., cable breaks, along the optical transmission path 203.

Optionally, more than one cable landing station may include similar components for redundancy and fault tolerance, and for local administration of network elements. For example, the second cable landing station 202-2 can include NMS 204-2, EMS 206-2 and LME 208-2. As discussed further below, each of the NMS components 204-1, 204-2, may collectively form a single NMS system 304 whereby users can log into any NMS component, e.g., directly via a graphical user interface (GUI), or via an API, and have requests serviced. In this example, one of the NMS components may operate as a master whereby the slave NMS systems proxy or otherwise forward requests to the master for handling. In the event the master NMS goes offline, the optical communication system 200 may be configured to automatically switch a slave NMS into the master role.

Figure 3:
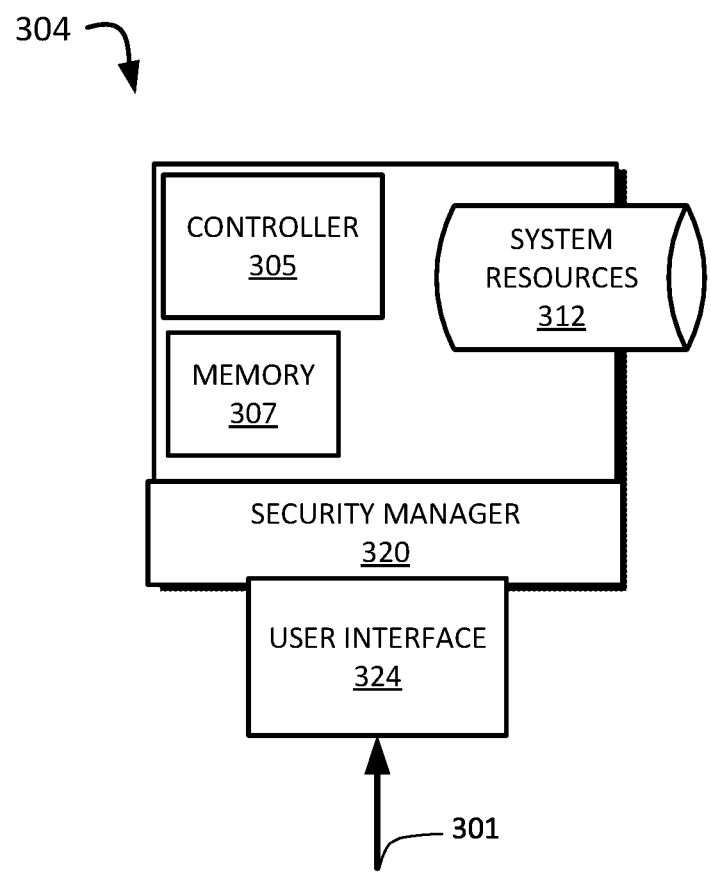
FIG. 3 is a simplified block diagram of an exemplary embodiment a network management system (NMS) suitable for use in the optical communication system of FIG. 2.

FIG. 3 shows an example network management system (NMS) architecture 304 consistent with the present disclosure. The NMS architecture 304 is depicted in a highly simplified form for clarity and not limitation. The NMS architecture 304 may be implemented in different configurations including, for instance, a plurality of NMS servers, EMS servers, LME, and so on, to collectively provide the NMS architecture 304. In this way, components may be distributed among multiple cable landing stations, e.g., CLS 202-1 . . . CLS 202-3 of FIG. 2, to provide redundancy, fault tolerance and to provide multiple points of access for users of the NMS architecture 200. The NMS 204 may be therefore collectively be implemented as a single NMS server, e.g., NMS 204-1, or may comprise a plurality of NMS systems as shown in FIG. 2, e.g., NMS 204-1, 204-2.

As further shown, the NMS 304 includes a plurality of associated components including a controller 305, a memory 307, a system resources database 312, a security manager 320 and a user interface 324. The NMS 304 may be implemented in hardware (e.g., circuitry), software, public/private cloud, or a combination thereof. In an embodiment, the NMS 304 may be implemented at least in part as a plurality of non-transitory instructions stored in memory 307 that may be executed by a controller 305 (which may also be referred to as an NMS controller) to carry out the NMS processes, e.g., process 800 of FIGS. 8A-8D. A controller, as generally referred to herein, may be implemented as a processor (e.g., x86 process or a virtual computer), field programmable gate array (FPGA), an application-specific integrated circuit (ASIC), or any other suitable processing device/circuitry.

Figure 4:
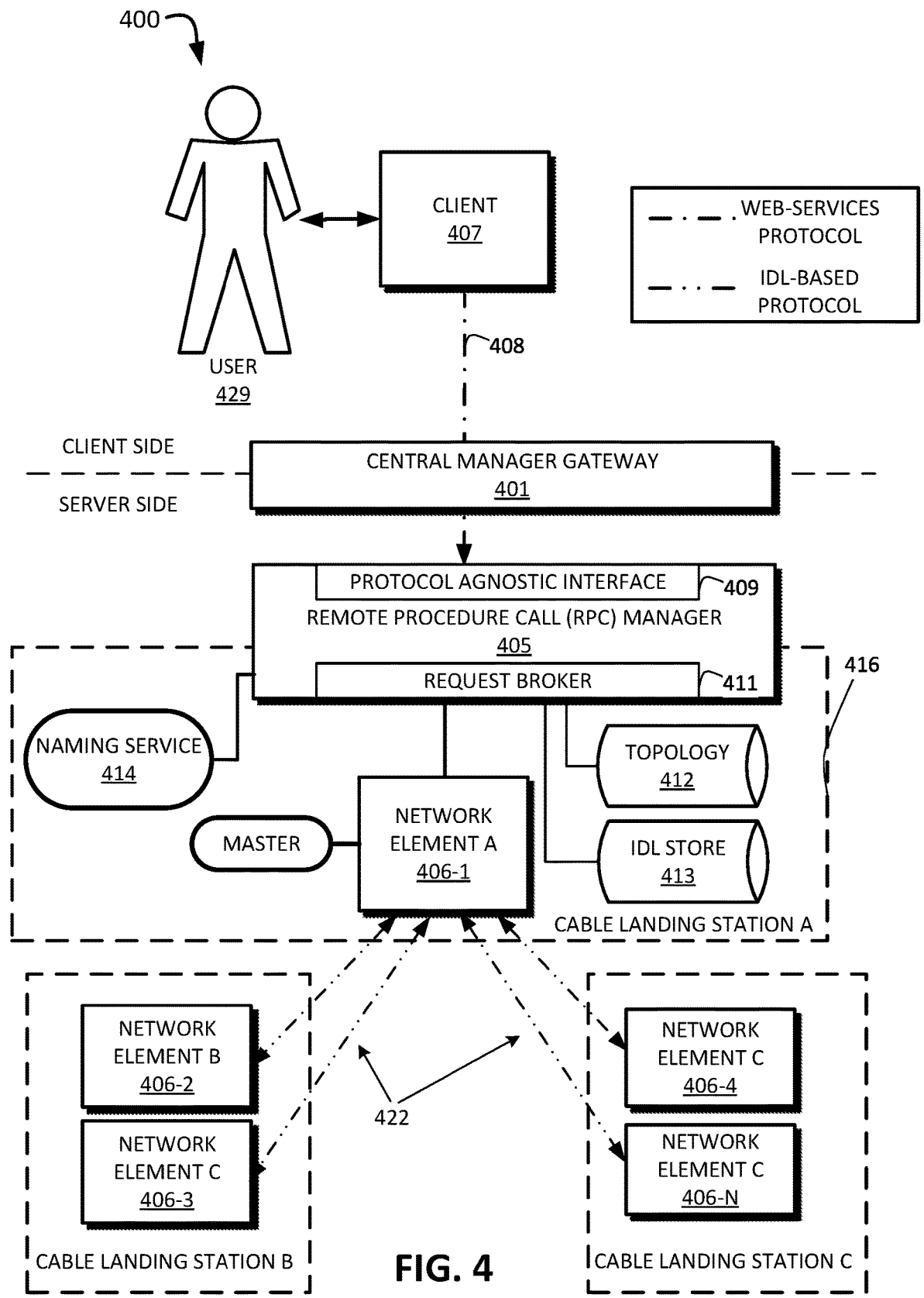
FIG. 4 is a simplified block diagram of an exemplary embodiment of a remote procedure call (RPC) architecture for use in the optical communication system of FIG. 2.

The user interface 324 may comprise graphical user interface (GUI) components and/or API components to receive and process requests from a user, e.g., user 429 (FIG. 4). In an embodiment, the API of the user interface may implement a REST architecture. In another embodiment, the API of the user interface 324 may implement a CORBA architecture. The security manager 320 may be configured to ensure that requests 301 received from a user are permissible based on the user's associated privileges and access rights.

The NMS 204 can include a system resources database 312 stored in the memory 307. The system resource database 312 may be distributed among a plurality of components including multiple NMSs and EMSs, for instance, and the embodiment shown in FIG. 3 is not intended to be limiting. For example, each cable landing station may include an EMS that stores data representative of each associated optical component (which may also be referred to as network elements) including, for instance, line cards, PFEs, repeaters, LMEs, equalizers, computer servers, and branching units. The NMS 203 may then utilize the EMS data from each of the cable landing stations to collectively and logically form the system resources table 312, although the data may be physically distributed among different cable landing stations. The system resources database 312 can include structured query language (SQL) databases, flat files (e.g., unique universal markup language (XML)), in-memory data structures, or any combination thereof.

FIG. 4 shows a block diagram that illustrates one example architecture 400 for remote procedure calls (RPCs) consistent with an embodiment of the present disclosure. As shown, the client side includes a user 429 that can utilize a client 407 to communicate with a central manager gateway 401. The client 407 may comprise a remote computing device such as a laptop, desktop computer, server computer, or smart phone with a controller/processor, memory, a user interface, and so on. The central manager gateway 401 may also be referred to as an RPC gateway 401. Note the central manager gateway 401 may be instantiated by one of the network elements, network element 406-1, or by a different server computer of the optical communication system 200. The client 407 may comprise a REST client, or other suitable client approach such as SOAP. The client 407 may utilize a web services object library, e.g., a REST framework, that allows for run-time instantiation of communication services and dynamic changes. In contrast to IDL-based protocols, web services allow for changes to be made at the protocol level without breaking client-server compatibility. The web services object library may therefore be developed in any number of programming languages such as, for example, C, C++, Java, Ruby, C#, VB.NET, Lua, Python, or any other suitable programming language.

In the context of server-side components, the RPC architecture 400 includes the central manager gateway 401 and a remote procedure call (RPC) manager 405 that may be implemented by a master network element. As shown, each of the network elements 406-1 to 406-N may include circuitry and/or software to execute an instance of the RPC manager 405. Those network elements that instantiate an RPC manager 405 may also be referred to as network element managers. Each of the network elements 406-1 to 406-N may be implemented as NMS servers, such as the NMS server 304 discussed above with reference to FIG. 3. However, each network element 406-1 to 406-N may be implemented as other types of systems including rack-mounted computer servers. In any event, each network element 406-1 to 406-N may include a plurality of instructions that when executed by an associated processor/controller cause a local instance of an RPC manager process to be executed. The network elements may elect a 'master' element by communicating with each other and selecting a master, e.g., via voting, or simply by whichever network element is online first. As shown in FIG. 4, the network element 406-1 is the master element and therefore hosts the RPC manager 405 which is accessible to the client 407 by way of the central manager gateway 401.

Each instance of the RPC manager 405 may include a plurality of components including a protocol agnostic interface 409 and a request broker 411. The protocol agnostic interface 409 may include N number of parser modules for servicing requests via REST or other desired protocol. The parser modules can allow for parsing requests, determining if the requests are valid (e.g., not malformed), whether the requests are allowed (e.g., by using the security manager 320), and to determine what the requirements of the request are. The request broker 411 may include a general central manager IDL parser, which is discussed in greater detail below with reference to FIG. 6. For example, the IDL parser may utilize a precompiled IDL, also known as an adapter, output from an CORBA IDL. In this example, the request broker 411 may provide a CORBA naming service 414. The CORBA naming service 414 allows other CORBA server applications to advertise object references using logical names. The client 407 may therefore request operations to be performed by a local, logical name by asking the RPC manager 405 to look up the name via the naming service 414.

Figure 5:
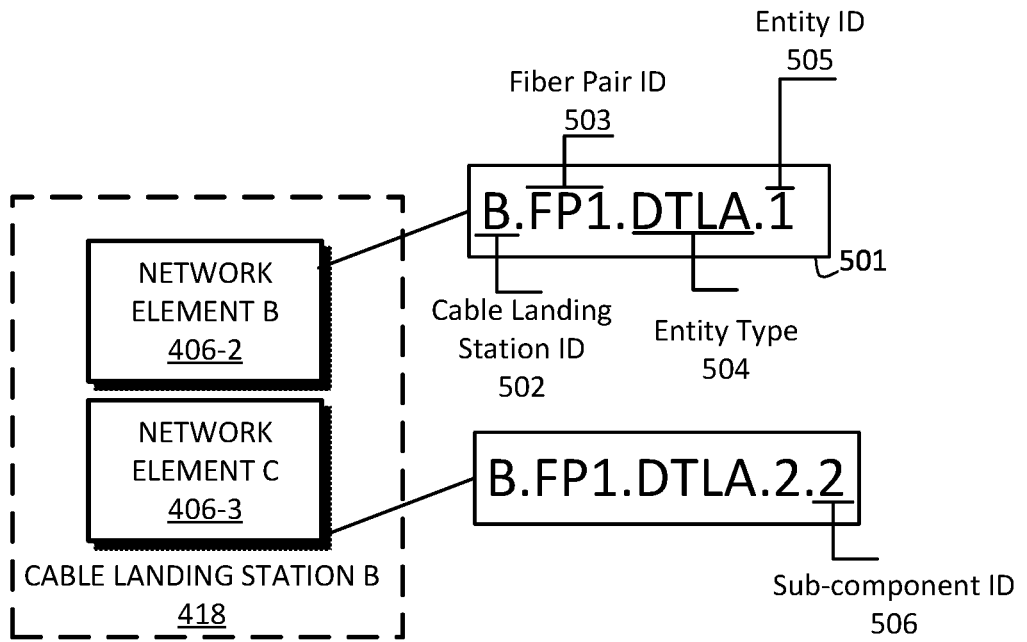
FIG. 5 shows an example network element address format for use in the RPC architecture of FIG. 4.

For example, as shown in FIG. 5, network element B 406-2 and network element C 406-3 may be uniquely identified within the optical communication system 200 based on a network element address 501. The network element address 501 may include a string of characters that follow a scheme that allows for each cable landing station to have a plurality of associated network elements. However, other naming schemes may be utilized, and the example shown in FIG. 5 is not intended to be limiting. Each network element address can include a predetermined sequence of entity type/entity ID pairs that convey the hierarchy of network elements and sub-components within a cable station and uniquely identifies each entity. For example, a Dual TLA network element is uniquely identified under its Cable and Fiber Pair scope, such as "Cable.1/FP.1/DTLA.1."

As further shown in FIG. 5, the network element address 501 may identify at least one or more of a cable landing station identifier 502, a fiber pair identifier 503, an element type ID 504, and an element ID 505. In addition, the network element address can include a sub-component ID, e.g., sub-component ID 506. Therefore, each network element may be assigned a network element address that may be registered with the naming service 414. Note that even while the master network element, e.g., network element A 406-1 shown in FIG. 4, performs name lookups for purposes of servicing requests, the other network elements, e.g., network elements 406-2 to 406-N, may also receive registrations to update and synchronize their local name services in the event that a new master network element is selected (e.g., due to a fault, cable break, power outage, and so on).

Returning to FIG. 4, each instance of the RPC manager 405 can receive registration messages from other network elements within the optical communication system 200. The registration data may be stored in a topology table 412 for use by the naming service 414. The registration data can include an IP address (IPv4, IPv6, and so on), hostname, device type and other network element characteristics. In some cases, the topology table 412 for each network element may be stored in the associated system resources database 312 (FIG. 3). In an embodiment, the topology table 412 defines a hierarchical object model of each network element and its subcomponents, with each component represented as an entity with attributes and child entities representing sub-components. Each entity may then be uniquely identified by its network element address and can includes a full-name attribute to provide a user-friendly name, such as "A.FP1. DTLA1" as discussed above with regard to FIG. 5. Each instance of the RPC manager 405 can support a generic IDL getTopology( ) method to retrieve a topology snapshot. Topology change events, e.g., CORBA events, can be sent as attribute value changes from each network element/entity so that each RPC manager 405 can keep synchronized topology data models (see FIG. 7).

In operation, the client 407 sends a request message 408. The request message 408 may be formatted in, for example, a web-services protocol such as SOAP or REST. The request message 408 may therefore be accurately described as having a self-descriptive format where the information schema may be derived from the message itself. For example, JSON self-describes in this fashion which allows for relatively easy parsing and message adaptability. In contrast, IDL-based schemes such as CORBA require the IDL to understand the schema of the messages. The request message 408 may identify at least one network element and an operation to perform. The network element may be identified by a network element address, e.g., the network element address 501 shown in FIG. 5. The operation may include a GET operation to get a requested attribute/data for a desired network element such as a configuration parameter, log data, uptime, status, and so on. The operation may further include a SET operation for changing a particular attribute/data.

The central manager gateway 401 may receive the request message 408. The central manager gateway 401 may then determine the current master network element to process the request. For example, as shown in FIG. 4 the network element A 406-1 is operating as the master network element. Accordingly, the central manager gateway 401 locates the network element A 406-1 and forwards the request message 408 to the same. The network element A 406-1 may then receive the request message 408 and process the same.

The network element A 406-1, and more particularly the RPC manager 405, may utilize the protocol agnostic interface 409 to parse the request message 408 to extract the network element address and the desired operation, e.g., using an HTTP parser module. The network element A 406-1 may perform an authentication to determine if the requested operation is authorized (e.g., using the security manager 320) before or after determining the requested network element exists as well as managing any persistency required while preserving the stateless attributes of the REST interface. The RPC manager 405 may query the topology table 412 to determine if the extracted network element address is known in the system. In the event the network element address is unknown, the RPC manager 405 may send a NAK message, e.g., an HTTP error code such as HTTP NOT_FOUND (404). If the network element is found win the topology table 412 (and the request is authorized), the RPC manager 405 determines if the operation of the request message 408 may be performed via local data such as information/attribute stored in the topology table 412. For example, some requests such as status and uptime may be serviced without necessarily communicating with remote network elements using CORBA messaging. Some such examples include getting a list of sub-components (e.g. LME port, LME switch position) under a network element (e.g. LME) and retrieving attributes of network elements and sub-components attributes such as operating state, fail LED state, and/or inventory information including (e.g. circuit pack model, and physical location, and so on).

In the event the requested operation cannot be performed using local data, the RPC manager 405 can utilize the request broker 411 to communicate with the network element associated with the extracted network element address. This communication may include using an IDL-based messaging scheme to send, for example, messages 422 that comport with the CORBA protocol. For example, the request broker 411 may have a pre-compiled IDL instance (or adapter) associated with each of the network elements in the system. The request broker 411 may therefore retrieve the pre-compiled IDL from the IDL store 413 to instantiate a client with an IDL that is compatible with the target network element. As previously discussed, the IDL of the client must match the IDL of the server in CORBA-based client-server communications. The IDL store 413 may therefore contain a library of precompiled IDL adapters, with each precompiled IDL adapter corresponding with one or more network elements. The request broker 411 may then convert the request message 408 to an equivalent IDL-based message based at least in part on the extracted network element address and the requested operation. In addition, the request broker 411 may then identify one or more remote procedure calls to perform using the IDL corresponding to the network element associated with the extracted network element address. For example, the requested operation may be to retrieve a particular configuration setting, and the IDL may define a remote procedure call GET_PARAMETER( ) that may be utilized to satisfy the requested operation. The request broker 411 may then send message 422 to the network element associated with the network element address.

In one example scenario, the request broker 411 may identify two or more remote procedure calls to perform using one or more precompiled IDL adapters in order to satisfy the request message 408. For example, some requests may necessitate communicating with two or more network elements such as requests for log data, status, and so on. In another example, some requests may necessitate calling two or more different remote procedure calls on a network element. For instance, a request for a plurality of measurement values such as error counts, power levels, and retransmit counts may necessitate calling multiple remote procedure calls using the messaging 422 to satisfy one request received by the RPC manager 405 from the user 429. Accordingly, one request message 408 may cause communication of messages 422 with two or more network elements by calling/executing one or more remote procedure calls of the two or more network elements.

Thus, the RPC architecture 400 consistent with the present disclosure allows for a 1:N relationship between the client 407 and multiple IDL-based server instances, namely network elements 406-1 to 406-N. In the context of CORBA, such a 1:N relationship transcends the limitations of the architecture as CORBA is limited to a 1:1 direct client-server communication flow (see FIG. 1 discussed above).

Figure 6:
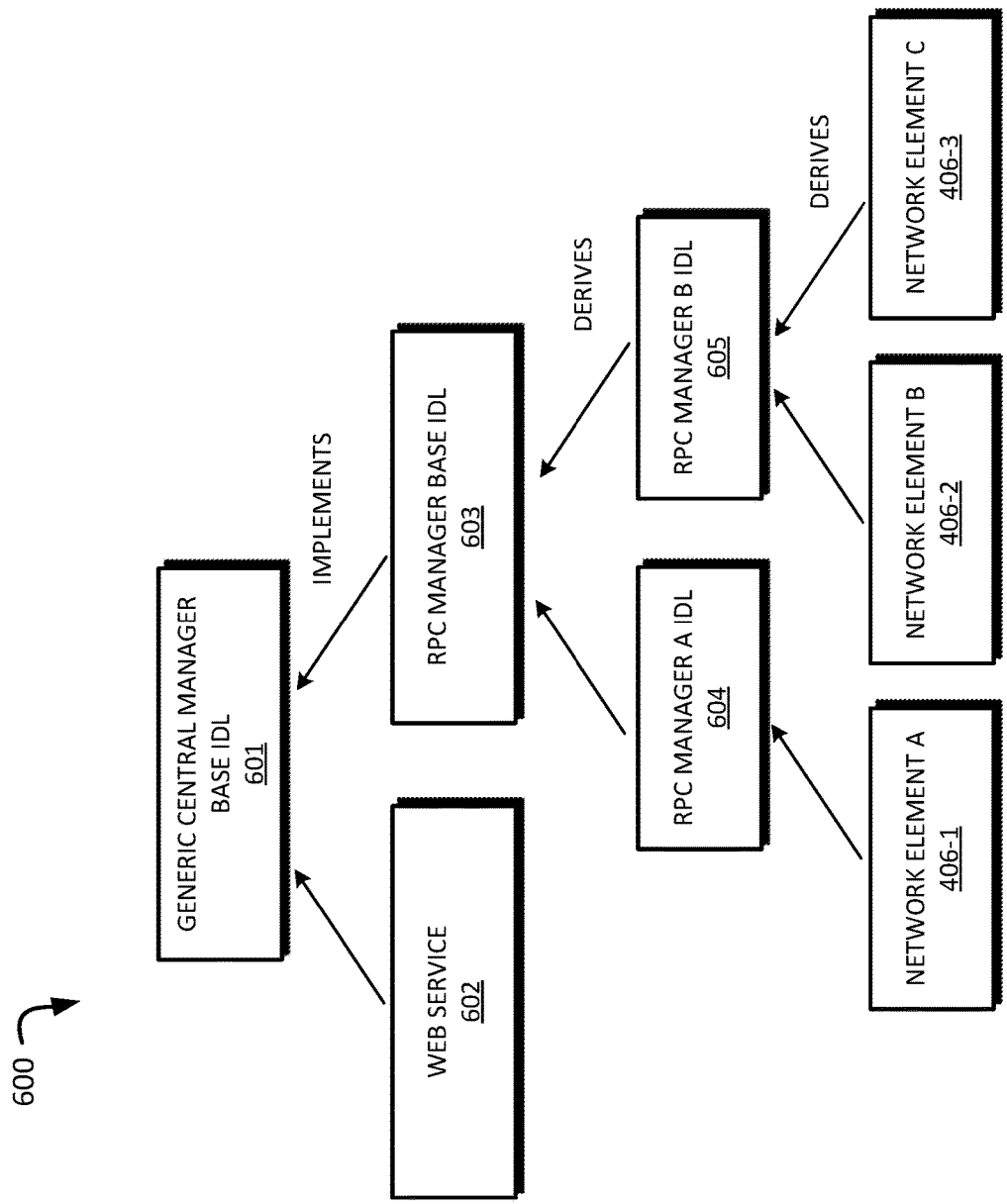
FIG. 6 shows a simplified block diagram of an interface description language (IDL) inheritance model consistent with aspects of the present disclosure.

FIG. 6 shows one example IDL inheritance model 600 consistent with aspects of the present disclosure. As shown, the IDL inheritance model 600 includes a generic central manager base IDL 601, a web service 602 (e.g., a REST server), an RPC manager base IDL 603, RPC manager A IDL 604, and RPC manager B IDL 605. The generic central manager IDL 601 defines interfaces which are common to all server components. The web service 602, which may be instantiated by the RPC manager 406 (FIG. 4) to handle user requests, e.g., REST requests, SOAP requests, and can implement the generic central manager base IDL for purposes of converting requests into equivalent remote procedure calls, as discussed above with regard to FIG. 4.

Likewise, the RPC manager base IDL 603 may define interfaces common to each network element such as, for example, remote procedure calls to acquire status information, operational parameters, diagnostic information, and so on. The RPC manager A IDL 604 and RPC manager B IDL 605 may further define interfaces specific to one or more types of network elements. For example, RPC manager A IDL 604 may define interfaces specific to line monitoring equipment (LME) and RPC manager B IDL 605 may define interfaces specific to optical repeater devices. The network elements, e.g., network elements 406-1 to 406-3, may therefore derive the IDL specific to their device type to ensure the proper interfaces are available to service requests. In another example, the RPC manager A IDL 604 and the RPC manager B IDL 605 may define 'stub' or placeholder functions that may set dynamically at runtime to allow users to customize the logic associated with each predetermined placeholder function. Accordingly, each client/server instance can load two or more precompiled IDL adapters, namely at least a first IDL adapter that defines common/default methods and functions to communicate, e.g., via CORBA, and a second IDL adapter with stub/placeholder functions to allow for runtime customization of the exposed RPC operations.

Figure 7:
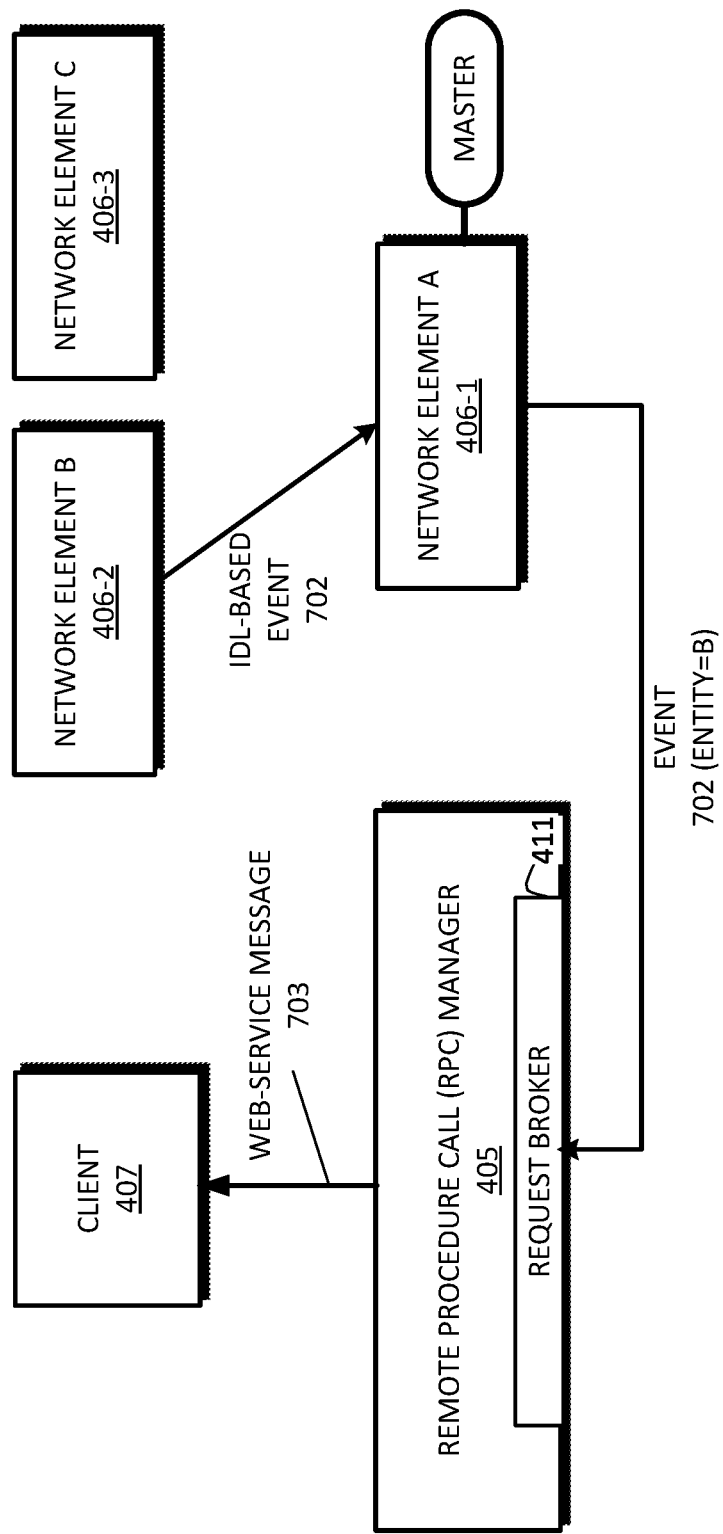
FIG. 7 shows an example communication for IDL-based event messages, in accordance with an embodiment of the present disclosure.
Figure 8A:
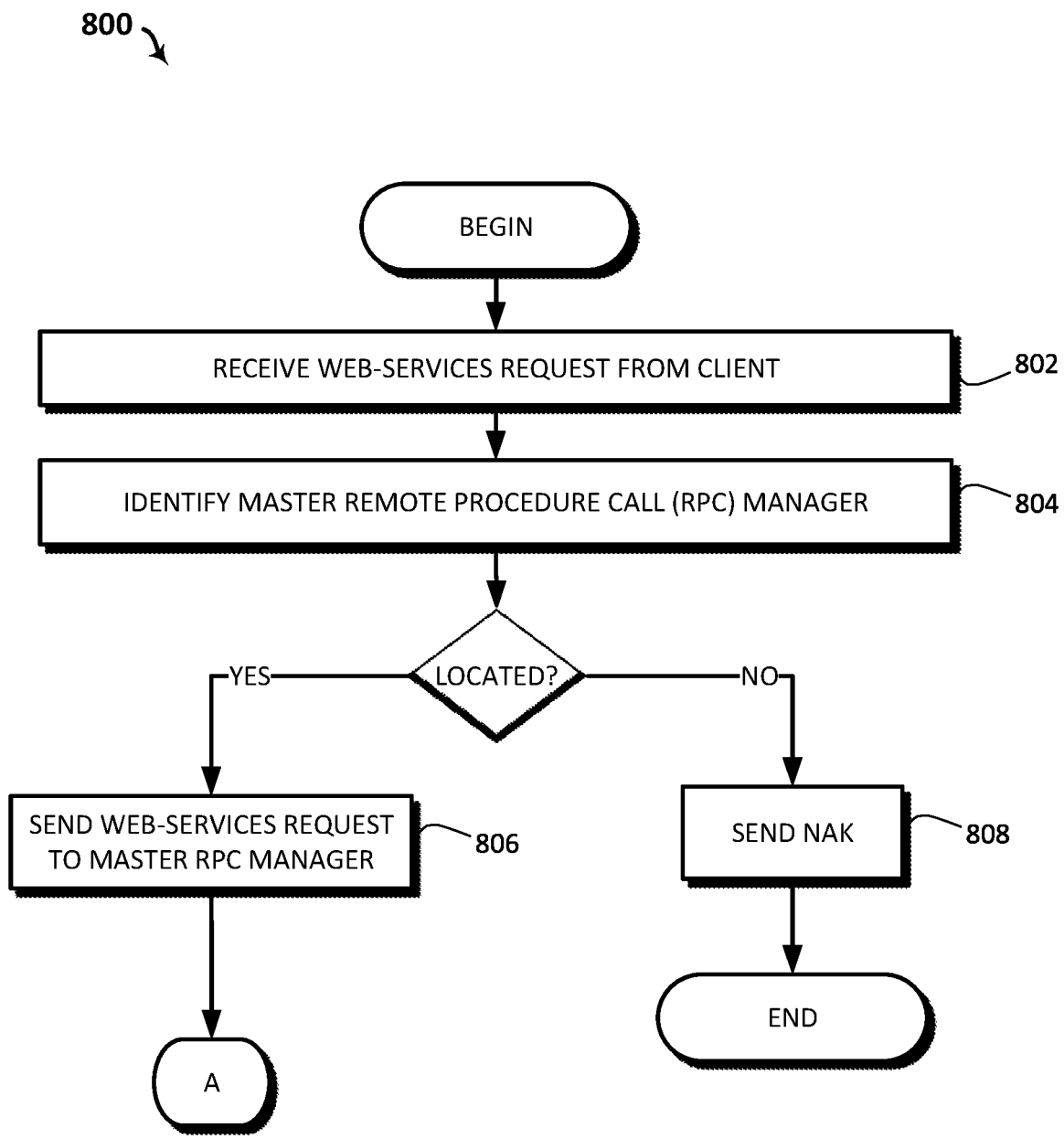
FIGS. 8A-8D collectively show an example method for servicing RPC requests within an optical communication system in accordance with an embodiment of the present disclosure.
Figure 8B:
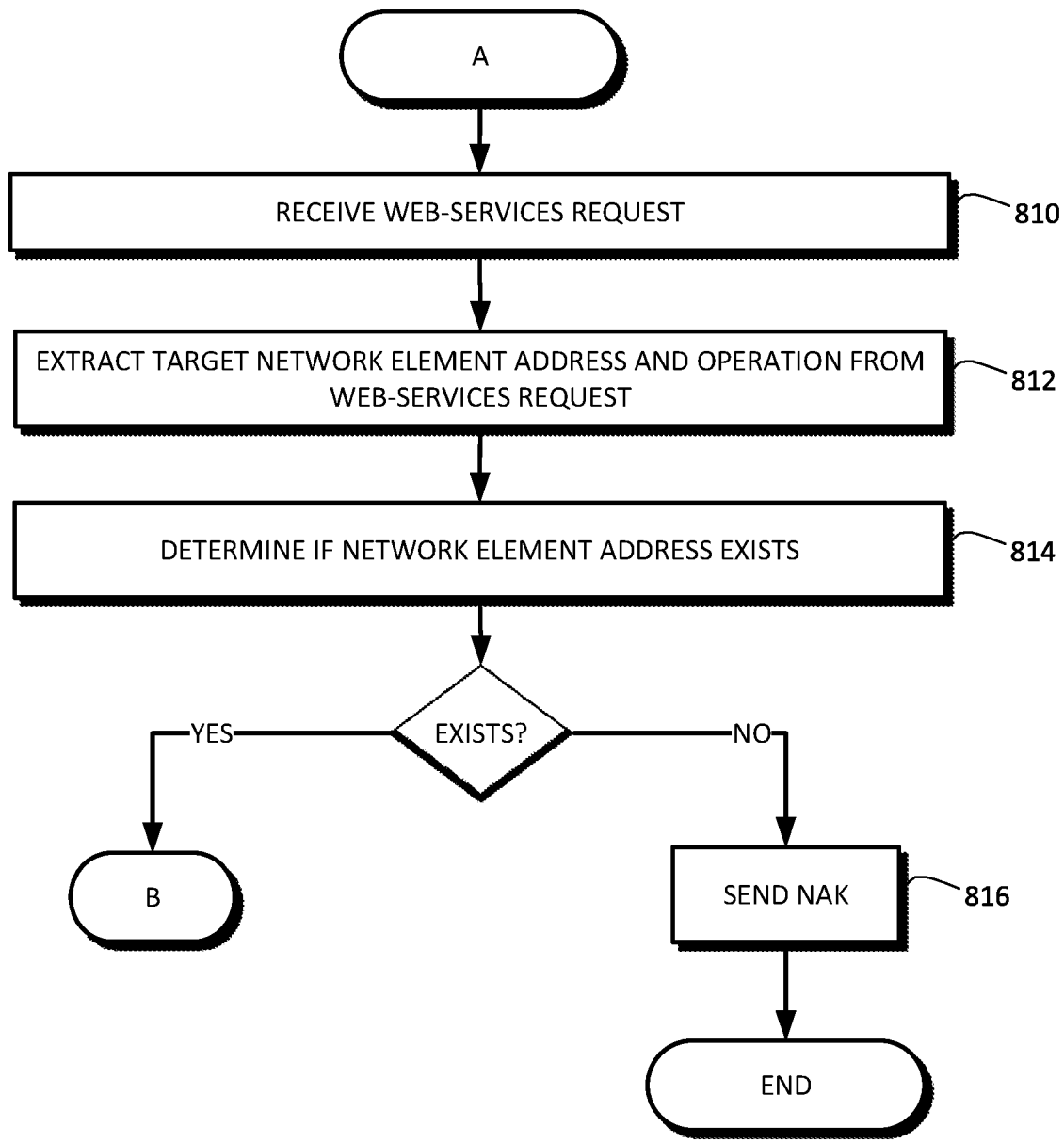
Figure 8C:
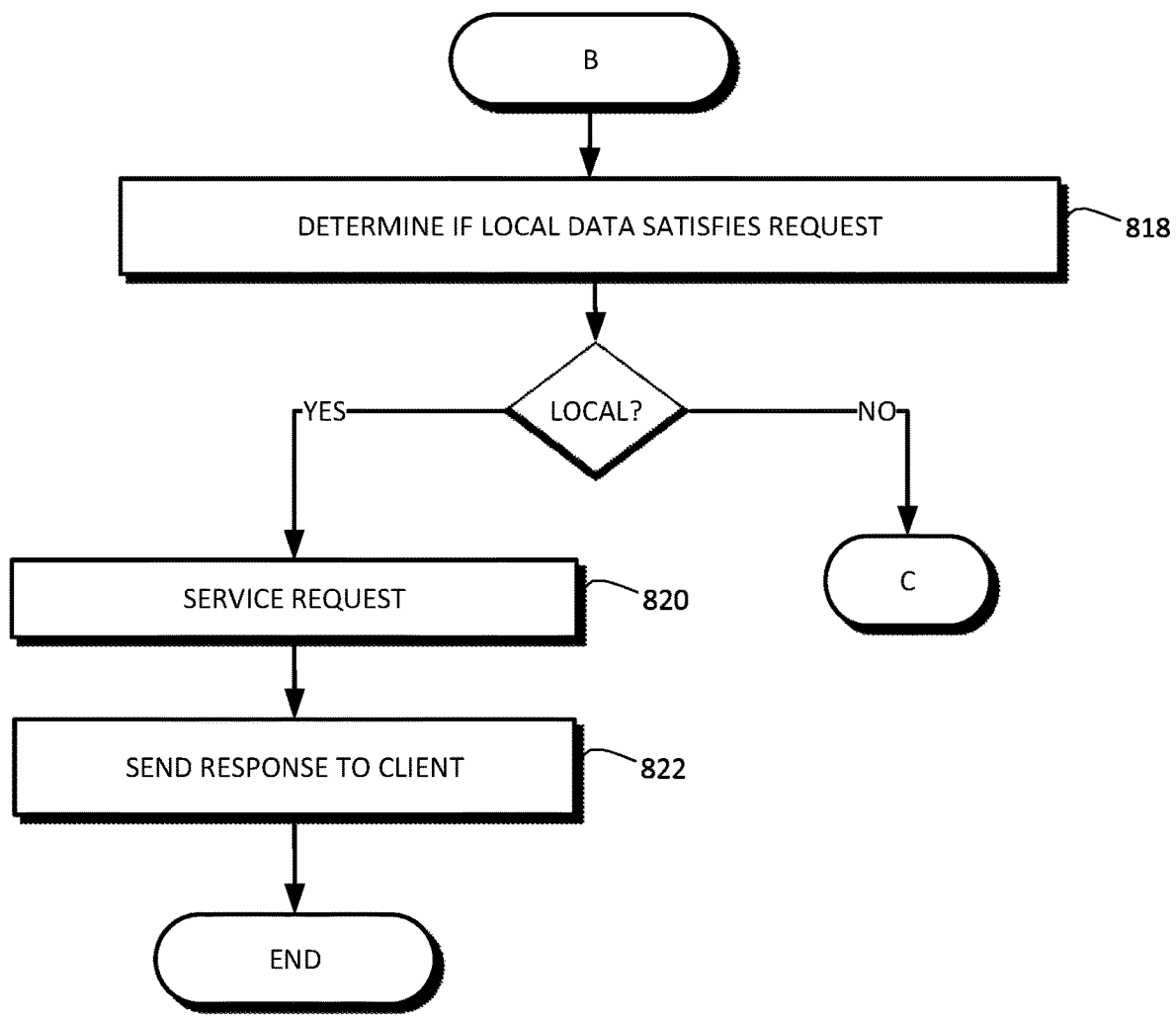
Figure 8D:
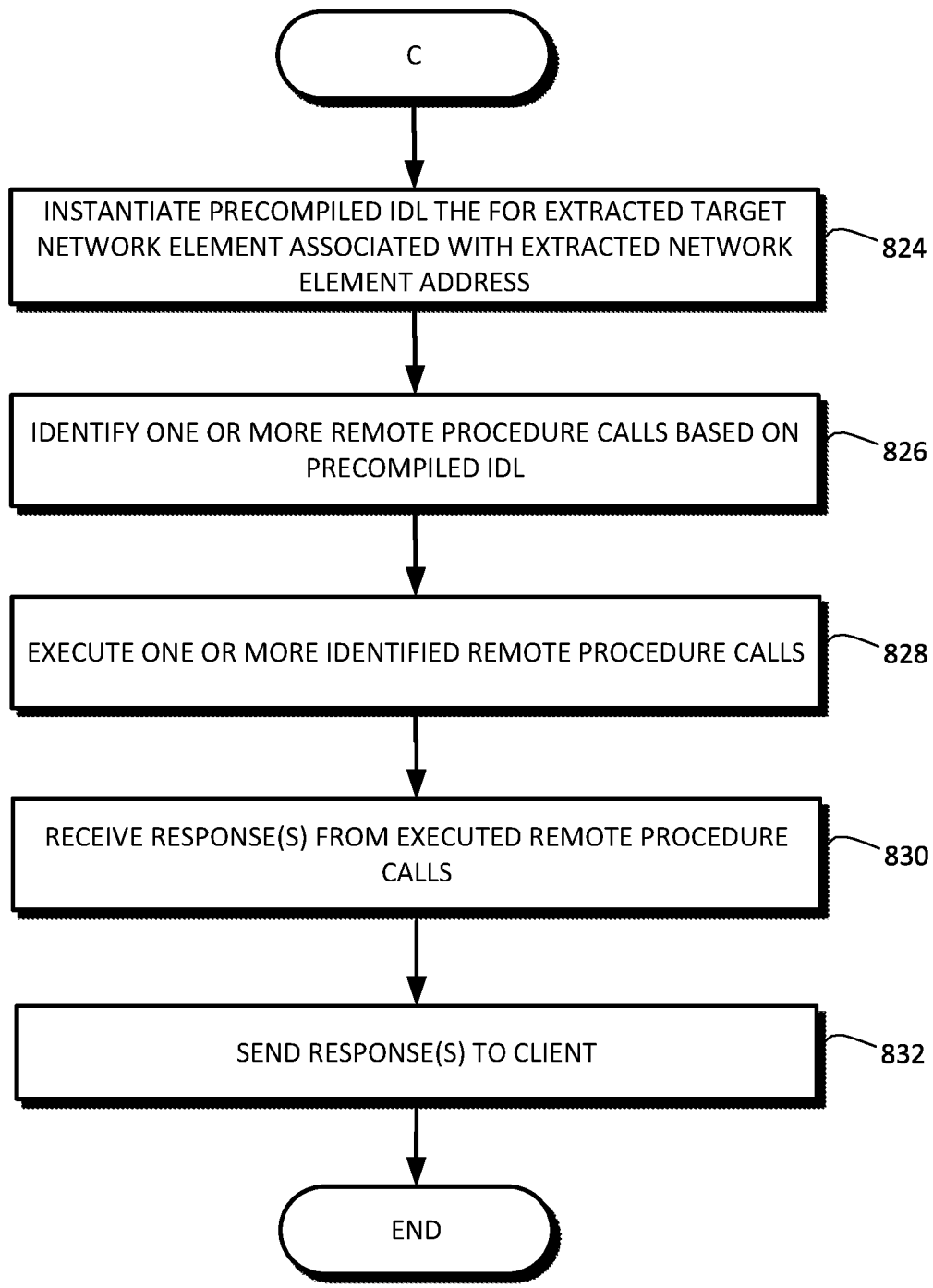

FIG. 7 shows an example event communication flow consistent with an embodiment of the present disclosure. As shown, the network element B 406-2 sends an IDL-based event message 702. For example, the IDL-based event message 702 may comport with the CORBA protocol. The network element A 406-1, operating as the master for RPC managing purposes, receives the IDL-based event message 702. The network element A 406-1, by virtue of instantiating RPC manager 405, converts the ID-based event 702 into a web-service message 703. The web-service message 703 includes at least a network element address and an identifier of an event type. The network element A 406-1 then sends the web-service message 703 to the client 407.

FIGS. 8A-8D collectively provide one example process 800 for servicing of requests by an RPC architecture that embodies aspects and embodiments disclosed above. The process 800 may manifest as a plurality of machine-readable instructions that may be executed by the controller 305 of the NMS 304 (FIG. 3) when operating as a RPC manager or central manager gateway instance.

In act 802, the central manager gateway 401 server receives a web services request from a client, e.g., client 407 (FIG. 4). The web services request may be in a format that comports with REST or SOAP, for example. The web services request may include one or more target network element addresses and an identifier of an operation to perform on the target network element(s). In act 804, the central manager gateway 401 identifies which of the network elements is operating as the master. In the event no master network element is present, in act 808 the central manager gateway 401 sends a negative acknowledgement (NAK) message, e.g., an HTTP error code. The NAK message may be sent in the same format as the request received in act 802, e.g., REST, JSON, and so on. On the other hand, in act 806 the central manager gateway 401 forwards/sends the web-services request to the master RPC manager, e.g., network element A 406-1 as shown in FIG. 4.

In act 810, the master RPC manager receives the forwarded web-services request. In act 812, the master RPC manager extracts the target network element address and operation from the received web-services request, e.g., using an HTTP parser module. The network element address format may comport with the format shown and described above with reference to FIG. 5. In act 814, the master RPC manager determines if the network element associated with the extracted target network element address exists. This may include, for example, querying the topology table 412 to determine if the extracted target network element address is known. If the target network element address exists, the process continues to act 818, otherwise, the process continues to act 816 and the master RPC manager sends a NAK message back to the client. The NAK message may be sent in the same format as the request received in act 802.

In act 818, the master RPC manager determines if local data may be utilized to service the request. As previously discussed, some information such as uptime, status, and so on, may be stored in the topology table 412 or otherwise in the memory 307. Accordingly, the attributes/characteristics stored in local data may be utilized to service the request. If local data satisfies the request, the master RPC manager retrieves the information from the local data and generates a response message. In act 822, the master RPC manager sends the generated response message to the client in the same format as the request received in act 802, e.g., in JSON, XML or other REST/SOAP compatible format.

In act 824, the master RPC manager may select and instantiate a precompiled IDL adapter (or simply an adapter) that corresponds with the target network element associated with the extracted target network element address. Act 824 may include the master RPC manager querying/performing a lookup on the IDL store 413 to identify an IDL that will allow the RPC manager to communicate with the target network element. As discussed above with regard to FIG. 6, a plurality of network elements may be associated with the same RPC manager IDL. Accordingly, the RPC manager may simply retrieve a precompiled IDL adapter based on the known type of the target network element. Alternatively, or in addition, the IDL store 413 may associate each network element with a particular precompiled IDL adapter, e.g., a 1:1 relationship. Thus, the master RPC manager may determine the precompiled IDL adapter to use based on the association between the target network element and its corresponding IDL in the IDL store 413.

In any event, and continuing to act 826, the master RPC manager can identify one or more remote procedure calls, e.g., functions/methods, to call on the target network element based on the precompiled IDL adapter instantiated/selected in act 824. In act 828, the master RPC manager executes the one or more identified remote procedure calls against the target network element. In act 830, the master RPC manager receives responses from the executed remote procedure call(s), and generates a response message based on the responses in the same format of the request received from the client in act 802, e.g., XML/JSON. In act 832, the master RPC manager sends the generated response message to the client, e.g., by routing the generated response message through the central manager gateway 401 or directly sending the generated response message to the client.

In accordance with an aspect of the present disclosure a network management system is disclosed. The network management system comprising a memory, a controller to receive a user request from a remote computing device, the user request including at least one network element address and an identifier of an operation to perform on the at least one network element address, extract the at least one network element address and the identifier of the operation to perform on the at least one network element address, select a precompiled interface description language (IDL) adapter associated with the at least one network element address from the memory, select at least one remote procedure call (RPC) function to satisfy the user request based on the selected precompiled IDL adapter, execute the at least one RPC function by sending at least one IDL-based message to one or more network elements associated with the at least one network element address, and send a response message to the remote computing device based on a response from the executed at least one RPC function, the response message being a same format as the user request.

In accordance with another aspect of the present disclosure a computer-implemented method for servicing remote procedure call requests is disclosed. The computer-implemented method including acts of receiving, by a controller, a user request from a remote computing device, the user request including a self-descriptive message that includes at least one network element address and an identifier of an operation to perform on the at least one network element address, extracting, by the controller, the at least one network element address and the identifier of the operation to perform on the at least one network element address, selecting, by the controller, a precompiled interface description language (IDL) adapter associated with the at least one network element address from a memory, selecting, by the controller, at least one remote procedure call (RPC) function to satisfy the user request based on the selected precompiled IDL adapter, executing, by the controller, the at least one RPC function by sending at least one IDL-based message to one or more network elements associated with the at least one network element address, and sending, by the controller, a response message to the remote computing device based on a response from the executed at least one RPC function, the response message being a same format as the user request.

In accordance with yet another aspect of the present disclosure an optical communication system is disclosed. The optical communication system comprising an optical communication path extending between a plurality of cable landing stations, each of the plurality of cable landing stations being associated with one or more network elements of a plurality of network elements disposed along the optical communication path, the system comprising, an RPC gateway server, the RPC gateway server to receive a user request, the user request including a self-descriptive message that includes an identifier of an operation and an identifier of at least one network element to perform the operation on, identify a network element operating as a master network element, and send a first message to the identified master network element, the first message to cause the master network element to select a precompiled interface description language (IDL) adapter corresponding with a network element associated with the identifier of the at least one network element, and to cause the master network element to send at least one message to the network element based on the selected IDL adapter and the operation.

Embodiments of the methods described herein may be implemented using a controller, processor and/or other programmable device. To that end, the methods described herein may be implemented on a tangible, non-transitory computer readable medium having instructions stored thereon that when executed by one or more processors perform the methods.

Thus, for example, the NMS 304 may include a storage medium to store instructions (in, for example, firmware or software) to perform the operations described herein. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any block diagrams, flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks labeled as "processor", may be provided through the use of dedicated hardware as well as hardware capable of executing software in association with appropriate software. The functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Although the methods and systems have been described relative to a specific embodiment thereof, they are not so limited. Obviously, many modifications and variations may become apparent in light of the above teachings. Many additional changes in the details, materials, and arrangement of parts, herein described and illustrated, may be made by those skilled in the art.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto.

What is claimed is:

1. A network management system comprising:
   a memory;
   a controller to:
      receive a user request from a remote computing device, the user request including at least one network element address and an identifier of an operation to perform on the at least one network element address;
      extract the at least one network element address and the identifier of the operation to perform on the at least one network element address;
      select a precompiled interface description language (IDL) adapter associated with the at least one network element address from the memory;
      select at least one remote procedure call (RPC) function to satisfy the user request based on the selected precompiled IDL adapter;
      execute the at least one RPC function by sending at least one IDL-based message to one or more network elements associated with the at least one network element address; and
      send a response message to the remote computing device based on a response from the executed at least one RPC function, the response message being a same format as the user request.

2. The network management system of claim 1, wherein the user request is a self-descriptive message that comports with a Simple Object Access Protocol (SOAP) standard or a Representative State Transfer (REST) standard.

3. The network management system of claim 1, wherein the at least one RPC function is executed based on a Common Object Request Broker Architecture (CORBA) architecture.

4. The network management system of claim 1, wherein the at least one network element address includes at least one of an identifier of a cable landing station, an element type, an element identifier (ID), and/or a subcomponent ID.

5. The network management system of claim 4, wherein the memory further includes a topology table stored therein, and wherein the topology table includes a plurality of network element addresses that each correspond with a different network element within an optical communication system.

6. The network management system of claim 1, wherein the memory further includes an IDL adapter table stored therein, and wherein the IDL adapter table includes a plurality of precompiled IDL adapters, each of the precompiled IDL adapters being associated with one or more network elements within an optical communication system.

7. The network management system of claim 6, wherein selecting the precompiled interface description language (IDL) adapter associated with the at least one network element address from the memory includes performing a lookup on the IDL adapter table.

8. The network management system of claim 1, wherein selecting a precompiled interface description language (IDL) adapter associated with the at least one network element address from the memory includes identifying at least a first and a second precompiled IDL adapter, the first precompiled IDL adapter including methods for general IDL-based communication and the second precompiled IDL adapter defining stub interfaces for runtime extensibility to provide customized logic for a network element.

9. The network management system of claim 1 implemented in an undersea optical communication system having a communication path extending between at least a first and second cable landing station.

10. A computer-implemented method for servicing remote procedure call requests, the method comprising:
receiving, by a controller, a user request from a remote computing device, the user request including a self-descriptive message that includes at least one network element address and an identifier of an operation to perform on the at least one network element address;
extracting, by the controller, the at least one network element address and the identifier of the operation to perform on the at least one network element address;
selecting, by the controller, a precompiled interface description language (IDL) adapter associated with the at least one network element address from a memory;
selecting, by the controller, at least one remote procedure call (RPC) function to satisfy the user request based on the selected precompiled IDL adapter;
executing, by the controller, the at least one RPC function by sending at least one IDL-based message to one or more network elements associated with the at least one network element address; and
sending, by the controller, a response message to the remote computing device based on a response from the executed at least one RPC function, the response message being a same format as the user request.

11. The method of claim 10, wherein the self-descriptive message comports with a Simple Object Access Protocol (SOAP) standard or a Representative State Transfer (REST) standard.

12. The method of claim 11, wherein executing the at least one RPC function includes using a Common Object Request Broker Architecture (CORBA) architecture.

13. The method of claim 10, wherein the at least one network element address includes at least one of an identifier of a cable landing station, an element type, an element identifier (ID), and/or a subcomponent ID.

14. The method of claim 10, wherein selecting the precompiled IDL adapter associated with the at least one network element address from the memory includes performing a lookup on an IDL adapter table, the IDL adapter table including a plurality of associations between network elements and precompiled IDL adapters.

15. The method of claim 10, wherein selecting an IDL adapter associated with the at least one network element address from the memory includes identifying at least first and second precompiled IDL adapters, the first precompiled IDL adapter including methods for general IDL-based communication and the second precompiled IDL adapter defining stub interfaces for runtime extensibility to provide customized logic for a network element.

16. The method of claim 10, implemented in an undersea optical communication system having a communication path extending between at least a first and second cable landing station.

17. An optical communication system comprising an optical communication path extending between a plurality of cable landing stations, each of the plurality of cable landing stations being associated with one or more network elements of a plurality of network elements disposed along the optical communication path, the system comprising:
a remote procedure call (RPC) gateway server, the RPC gateway server to:
receive a user request, the user request including a self-descriptive message that includes an identifier of an operation and an identifier of at least one network element to perform the operation on;
identify a network element operating as a master network element; and
send a first message to the identified master network element, the first message to cause the master network element to select a precompiled interface description language (IDL) adapter corresponding with a network element associated with the identifier of the at least one network element, and to cause the master network element to send at least one message to the network element based on the selected IDL adapter and the operation.

18. The optical communication system of claim 17, wherein the RPC gateway server implements a representative state transfer (REST) server, and wherein the user request is REST request.

19. The optical communication system of claim 17, wherein the first message sent to the identified master network element is configured to cause the identified master network element to communicate via Common Object Request Broker Architecture (CORBA) with the network element associated with the identifier of the at least one network element.

20. The optical communication system of claim 17, wherein the RPC gateway server is implemented within a network management server (NMS) configured to manage the plurality of network elements in the optical communication system.

21. The optical communication system of claim 17, wherein the network element associated with the identifier of the at least one network element comprises a branching unit (BU), network management system, a reprogrammable optical add/drop multiplexers (ROADM), a repeater, power feed equipment (PFE), or line monitoring equipment (LME).

* * * * *